(12) United States Patent
Behrens et al.

(10) Patent No.: US 11,570,749 B2
(45) Date of Patent: Jan. 31, 2023

(54) LIVING NOTIFICATIONS

(71) Applicant: Fitbit, Inc., Mountain View, CA (US)

(72) Inventors: Heiko Behrens, Menlo Park, CA (US);
Henry Levak, San Mateo, CA (US);
Yoon Kean Wong, Redwood City, CA (US)

(73) Assignee: FITBIT, INC., Mountain View, CA (US)

( * ) Notice: Subject to any disclaimer, the term of this patent is extended or adjusted under 35 U.S.C. 154(b) by 0 days.

(21) Appl. No.: 17/322,311

(22) Filed: May 17, 2021

(65) Prior Publication Data

US 2022/0210763 A1 Jun. 30, 2022

Related U.S. Application Data

(63) Continuation of application No. 15/826,650, filed on Nov. 29, 2017, now abandoned, which is a continuation of application No. 14/693,557, filed on Apr. 22, 2015, now abandoned.

(51) Int. Cl.
*H04L 67/55* (2022.01)
*H04W 68/00* (2009.01)

(52) U.S. Cl.
CPC ............. *H04W 68/00* (2013.01); *H04L 67/55* (2022.05)

(58) Field of Classification Search
None
See application file for complete search history.

(56) References Cited

U.S. PATENT DOCUMENTS

| | | | | |
|---|---|---|---|---|
| 5,821,928 A * | 10/1998 | Melkus | .................... | G06F 9/451 715/809 |
| 5,966,663 A * | 10/1999 | Gleason | .............. | H04M 3/5307 455/466 |
| 6,438,216 B1 * | 8/2002 | Aktas | .................... | H04M 3/436 704/E15.045 |
| 7,310,720 B2 * | 12/2007 | Cornett | ................ | G05B 19/056 711/170 |
| 7,533,051 B2 * | 5/2009 | Powell | .................... | G06Q 40/12 713/156 |
| 7,609,686 B1 * | 10/2009 | McNamara | ......... | H04L 12/1859 725/135 |
| 7,647,243 B2 * | 1/2010 | Woolston | ................ | G06Q 20/12 705/26.81 |
| 7,818,223 B1 * | 10/2010 | Campbell | .............. | G06Q 30/04 705/40 |
| 7,953,647 B2 * | 5/2011 | Bolivar | .............. | G06Q 30/0609 705/26.1 |

(Continued)

FOREIGN PATENT DOCUMENTS

| | | |
|---|---|---|
| EP | 2504961 | 10/2012 |
| EP | 002655142-0001 | 3/2015 |
| EP | 002655118-0001 | 4/2015 |

OTHER PUBLICATIONS

Final Rejection issued in U.S. Appl. No. 14/693,557, dated Oct. 15, 2015.

(Continued)

*Primary Examiner* — Backhean Tiv
(74) *Attorney, Agent, or Firm* — Dority & Manning, P.A.

(57) ABSTRACT

A method, apparatus, and system relating to a notification system for merging a new message into a pending notification.

11 Claims, 6 Drawing Sheets

(56) References Cited

U.S. PATENT DOCUMENTS

| | | | | |
|---|---|---|---|---|
| 8,099,520 | B2* | 1/2012 | Kulkarni | G06Q 30/0251 709/228 |
| 8,688,528 | B2* | 4/2014 | Leahy | G06Q 30/08 705/26.1 |
| 8,930,067 | B1* | 1/2015 | Green | H04W 12/084 705/7.41 |
| D733,142 | S | 6/2015 | Solomon et al. | |
| D743,278 | S | 11/2015 | Solomon et al. | |
| D745,515 | S | 12/2015 | Solomon et al. | |
| 9,560,631 | B2* | 1/2017 | Migicovsky | H04W 4/12 |
| 9,774,723 | B2* | 9/2017 | Baldassari | H04M 1/72412 |
| 9,911,086 | B2* | 3/2018 | Gibson | G06Q 20/045 |
| 10,586,274 | B2* | 3/2020 | Tapley | G06Q 30/0641 |
| 11,032,137 | B2* | 6/2021 | Park | H04M 1/72412 |
| 11,164,243 | B1* | 11/2021 | Buckham | G06Q 30/08 |
| 11,354,729 | B2* | 6/2022 | Tapley | G06Q 30/08 |
| 2002/0018547 | A1* | 2/2002 | Takae | H04M 3/4931 379/201.02 |
| 2002/0065761 | A1* | 5/2002 | Fischer | G06Q 30/08 705/37 |
| 2002/0116472 | A1* | 8/2002 | Kalish | H04L 67/56 709/218 |
| 2003/0126590 | A1* | 7/2003 | Burrows | G06F 8/437 712/E9.036 |
| 2004/0044736 | A1* | 3/2004 | Austin-Lane | H04L 51/00 709/206 |
| 2004/0128224 | A1* | 7/2004 | Dabney | G06Q 40/00 705/37 |
| 2004/0193529 | A1* | 9/2004 | Asher | G06Q 30/0641 705/37 |
| 2004/0236897 | A1* | 11/2004 | Cheng | G06F 12/0246 711/E12.008 |
| 2004/0260780 | A1* | 12/2004 | Eisen | G06Q 10/109 709/207 |
| 2005/0240512 | A1* | 10/2005 | Quintero | G06Q 30/0603 705/37 |
| 2005/0256734 | A1* | 11/2005 | Clikeman | G06Q 90/00 705/1.1 |
| 2005/0278643 | A1* | 12/2005 | Ukai | G09G 5/00 715/754 |
| 2006/0117140 | A1* | 6/2006 | Matsui | G06F 12/0822 711/119 |
| 2006/0143307 | A1* | 6/2006 | Codignotto | G06F 40/117 709/246 |
| 2006/0149655 | A1* | 7/2006 | Leahy | G06Q 40/04 705/37 |
| 2006/0242412 | A1* | 10/2006 | Jung | H04L 63/061 713/171 |
| 2006/0253451 | A1* | 11/2006 | Van De Sluis | G06F 12/121 711/E12.07 |
| 2006/0255963 | A1* | 11/2006 | Thompson | H04B 1/385 340/12.23 |
| 2006/0277481 | A1* | 12/2006 | Forstall | G06F 16/957 715/764 |
| 2007/0005701 | A1* | 1/2007 | Barsness | H04L 51/04 709/205 |
| 2007/0008330 | A1* | 1/2007 | Xu | G06T 15/04 345/557 |
| 2007/0027794 | A1* | 2/2007 | Brett | H04L 12/1809 705/37 |
| 2007/0043646 | A1* | 2/2007 | Morris | G06Q 40/04 705/37 |
| 2007/0050510 | A1* | 3/2007 | Jiang | H04W 4/12 709/227 |
| 2007/0197196 | A1* | 8/2007 | Shenfield | H04L 67/55 455/412.2 |
| 2007/0197878 | A1* | 8/2007 | Shklarski | A61B 5/0022 128/903 |
| 2007/0226118 | A1 | 9/2007 | Gill | |
| 2007/0268985 | A1* | 11/2007 | Ry | H03M 13/09 375/295 |
| 2007/0271234 | A1* | 11/2007 | Ravikiran | G06F 16/2471 |
| 2008/0114671 | A1* | 5/2008 | Goel | G06Q 30/08 705/37 |
| 2008/0188251 | A1* | 8/2008 | Weinrib | H04W 4/14 455/466 |
| 2009/0164359 | A1* | 6/2009 | Loui | G06Q 30/08 705/37 |
| 2009/0182642 | A1* | 7/2009 | Sundaresan | G06Q 30/0281 705/26.1 |
| 2009/0248962 | A1* | 10/2009 | Kim | G06F 12/0246 711/E12.001 |
| 2009/0276364 | A1* | 11/2009 | Iaia | G06Q 40/12 705/26.1 |
| 2009/0319366 | A1* | 12/2009 | Choi | G06Q 30/0269 705/14.55 |
| 2009/0322513 | A1* | 12/2009 | Hwang | H04W 4/90 600/301 |
| 2010/0058231 | A1* | 3/2010 | Duarte | H04M 1/72436 715/800 |
| 2010/0087230 | A1* | 4/2010 | Peh | H04M 1/72451 345/173 |
| 2010/0091677 | A1* | 4/2010 | Griff | H04L 41/12 370/252 |
| 2010/0121728 | A1* | 5/2010 | Sun | G06Q 30/02 705/26.1 |
| 2010/0179991 | A1* | 7/2010 | Lorch | H04L 51/10 715/810 |
| 2010/0180001 | A1* | 7/2010 | Hardt | H04L 12/189 715/752 |
| 2010/0241819 | A1* | 9/2010 | Yoshii | G06F 12/0246 711/170 |
| 2010/0293238 | A1* | 11/2010 | Nottingham | H04L 51/00 709/206 |
| 2011/0004692 | A1* | 1/2011 | Occhino | H04L 67/306 709/228 |
| 2011/0065475 | A1* | 3/2011 | Choi | H04L 67/52 709/218 |
| 2011/0075621 | A1* | 3/2011 | Sung | H04W 48/12 370/329 |
| 2011/0112952 | A1* | 5/2011 | Annunziata | G06Q 40/04 705/37 |
| 2011/0113073 | A1* | 5/2011 | Chang | G06F 16/20 707/E17.005 |
| 2011/0173086 | A1* | 7/2011 | Berkowitz | G06Q 30/08 705/26.3 |
| 2012/0058776 | A1* | 3/2012 | Ligeret | H04W 4/02 455/466 |
| 2012/0066068 | A1* | 3/2012 | Pan | G06Q 30/0267 705/14.1 |
| 2012/0123892 | A1* | 5/2012 | Ananta | G06Q 30/08 705/26.3 |
| 2012/0137063 | A1* | 5/2012 | Horibe | G06F 12/0866 711/E12.019 |
| 2012/0196571 | A1* | 8/2012 | Grkov | G06F 3/165 455/411 |
| 2012/0210334 | A1* | 8/2012 | Sutedja | H04L 51/216 719/314 |
| 2012/0253946 | A1* | 10/2012 | Moore | G06Q 10/00 705/14.71 |
| 2012/0260215 | A1* | 10/2012 | Fennel | H04W 4/50 715/825 |
| 2013/0024779 | A1* | 1/2013 | Bechtel | G06F 3/04842 715/752 |
| 2013/0040610 | A1 | 2/2013 | Migicovsky et al. | |
| 2013/0077772 | A1* | 3/2013 | Lichorowic | G06Q 40/08 379/88.01 |
| 2013/0117707 | A1* | 5/2013 | Wheeler | G06F 3/012 715/784 |
| 2013/0132977 | A1* | 5/2013 | Doyle | A61M 1/1601 719/318 |
| 2013/0196685 | A1* | 8/2013 | Griff | H04W 4/02 455/456.1 |
| 2013/0218971 | A1* | 8/2013 | Sasaki | H04L 67/00 709/204 |
| 2013/0219332 | A1* | 8/2013 | Woley | H04M 1/72403 715/808 |

(56) References Cited

U.S. PATENT DOCUMENTS

| | | | |
|---|---|---|---|
| 2013/0305187 A1* | 11/2013 | Phillips | G06F 3/0481 |
| | | | 715/800 |
| 2013/0346521 A1* | 12/2013 | Arabo | H04L 67/61 |
| | | | 709/206 |
| 2014/0013207 A1* | 1/2014 | Wu | G06F 3/0484 |
| | | | 715/753 |
| 2014/0038561 A1* | 2/2014 | Wang | H04W 12/086 |
| | | | 455/411 |
| 2014/0136493 A1* | 5/2014 | Subramanian | G06F 16/162 |
| | | | 707/693 |
| 2014/0143803 A1* | 5/2014 | Narsimhan | H04N 21/47217 |
| | | | 725/34 |
| 2014/0181414 A1* | 6/2014 | Eckert | G06F 1/3225 |
| | | | 711/135 |
| 2014/0229655 A1* | 8/2014 | Goss | G06F 11/1048 |
| | | | 711/103 |
| 2014/0282047 A1* | 9/2014 | Lee | G06F 3/0488 |
| | | | 715/741 |
| 2014/0289066 A1* | 9/2014 | Shah | G06Q 30/08 |
| | | | 705/26.3 |
| 2014/0350969 A1* | 11/2014 | Maltzman | G06Q 10/06395 |
| | | | 705/37 |
| 2015/0065893 A1* | 3/2015 | Ye | A61B 5/0205 |
| | | | 600/595 |
| 2015/0089666 A1* | 3/2015 | Lee | G06F 21/6245 |
| | | | 726/27 |
| 2015/0100644 A1* | 4/2015 | Gulik | H04L 51/216 |
| | | | 709/206 |
| 2015/0106221 A1* | 4/2015 | Tapley | G06Q 30/0641 |
| | | | 705/27.1 |
| 2015/0120845 A1* | 4/2015 | McClard | H04L 51/224 |
| | | | 709/206 |
| 2015/0123775 A1* | 5/2015 | Kerdemelidis | G06F 3/016 |
| | | | 340/407.1 |
| 2015/0126117 A1 | 5/2015 | Wong et al. | |
| 2015/0128051 A1* | 5/2015 | Strain | H04L 67/62 |
| | | | 715/735 |
| 2015/0223033 A1 | 8/2015 | Migicovsky et al. | |
| 2015/0223034 A1 | 8/2015 | Migicovsky et al. | |
| 2015/0333302 A1 | 11/2015 | Johns et al. | |
| 2015/0334772 A1 | 11/2015 | Wong et al. | |
| 2016/0246453 A1* | 8/2016 | Vonshak | G06F 1/163 |
| 2016/0253749 A1* | 9/2016 | Gray | G06Q 30/0641 |
| | | | 705/26.3 |
| 2016/0316450 A1* | 10/2016 | Behrens | H04L 67/55 |
| 2017/0244660 A1* | 8/2017 | Gunnewiek | H04B 1/385 |
| 2018/0092059 A1* | 3/2018 | Behrens | H04W 68/00 |
| 2020/0202417 A1* | 6/2020 | Tapley | G06Q 30/0641 |

OTHER PUBLICATIONS

Non-Final Rejection issued in U.S. Appl. No. 14/693,557, dated Jun. 25, 2015, 21 pages.

* cited by examiner

LIVING NOTIFICATIONS

CROSS-REFERENCES TO RELATED APPLICATIONS

This application is a continuation of U.S. patent application Ser. No. 15/826,650, entitled "LIVING NOTIFICATIONS" filed Nov. 29, 2017 (abandoned), which is a continuation of U.S. patent application Ser. No. 14/693,557, entitled "LIVING NOTIFICATIONS" filed Apr. 22, 2015, (abandoned), each of which are incorporated herein by reference for all purposes.

BACKGROUND OF THE INVENTION

Field of the Invention

The invention relates generally to a method, system, and apparatus for merging new messages into a pending notification.

Description of the Related Art

User communication devices, such as smartphones and smartwatches, allow users to interact and communicate with users of other communication devices. These devices typically include a means for sending communications, such as texts and e-mails. Additionally, many communication devices, such as smartphones, allow users to install applications or programs that may have their own unique messaging or notification system. For example, the popular online bidding service/store eBay® created an application designed for use with smartphones (e.g., Apple® iPhone® or Samsung® Galaxy®). That application has its own notification system that alerts a user when a particular event has occurred. The eBay® application may, among other things, notify a user that he or she has been outbid, a user has bid on his or her product, or the user's bid on a product has been successful.

When communications such as these are received by a communication device, a visual and/or auditory notification will alert the user of the incoming communication. For example, in reference to the prior art notification system in FIG. 1(a), a notification 104 is displayed based on a communication received by a communication device 102 (e.g., a smartwatch) and the name of the sender of the communication (i.e., eBay®), the time the communication was received (i.e., 1:28 PM) and the substance of the new communication (i.e., "You have been outbid! . . . ") are displayed on the communication device's display io6. Often times, if multiple communications are received the communication device will indicate on the device display that multiple communications have been received without revealing the substance of the communication.

For example, in reference to the prior art notification system in FIG. 1(b), the communication device 102 received two new communications, which the communication device indicates in notification dialogue box 108. In this case, the user may only view the substance of the messages by performing a user action (e.g., clicking on the dialogue box 108 to open the messages). Alternatively, in reference to FIG. 1(c), the communication device 102 may display both the old communication 104 and the new communication 110. The new communication no may be below the old communication 104, even though the user may have less interest in notification 104. In many cases such as these, a user will actually have little to no interest in any communication occurring before the most recent communication. For example, with regard to the eBay® application a user may only be interested in seeing the notification for the most recent bid, as all past bids essentially become irrelevant when a new bid is placed. As such, current notification systems may display communications that have little to no importance to the user of the communication device, thereby unnecessarily occupying display space on the communication device and potentially requiring the user to perform additional actions in order to view and/or remove the unwanted information. The disadvantage of such systems are even more apparent when viewed in the context of wearable accessory devices, such as smartwatches.

Smartphones are generally much larger than smartwatches and are expected by users to be carried in their pocket, purse, or the like. Wearable user devices, on the other hand, are expected by users to be smaller and comfortably worn. Moreover, because wearable user devices are expected to be worn as an accessory, users desire more stylish, sleek, and compact seeming wearable devices. A substantial component of any smartwatch is the watch display. Generally, smartphones have very large high quality liquid-crystal displays. As such, it is expected by smartphone users that the phone will be carried in their pocket, purse, or the like and that the phone need only be small enough to fit in the user's hands. In stark contrast, several of the features that are typically found in a smartphone are generally sacrificed in a smartwatch because of the expectations of the user discussed above. Due to some of these design sacrifices, a much smaller display is expected in a watch so that the watch will fit comfortably on the user's wrist and remain stylish and visually appealing. Because of the limited space of a smartwatch watch display, the need for efficiently conveying information to the smartwatch user in as little space or user actions as possible is of more significance than when dealing with smartphones.

Thus, the need exists in the field of communication devices for a communication notifications system that requires less display space to convey the substance of new and relevant communications, while modifying pending notifications to conceal messages that may lose their relevance. Moreover, the need exists in that field for a communication notifications system that requires fewer user actions to allow the user to view the relevant communications, and fewer actions for the user to remove the irrelevant communications from the display space. This need is especially great in the field of wearable communications devices, such as smartwatches, where space efficiency, conservation, and ease-of-use are of key importance.

SUMMARY OF THE INVENTION

Implementations of the presently disclosed technology relate to a system, method, and apparatus for merging new communications into pending notifications. More specifically, the presently disclosed technology relates to displaying the substance of a new, relevant message of a new communication by merging the message into a pending notification by overwriting a prior message.

BRIEF DESCRIPTION OF THE FIGURES

The accompanying drawings, which are incorporated in and constitute a part of this specification, illustrate an implementation of apparatuses and methods consistent with the present invention and, together with the detailed description, serve to explain advantages and principles consistent with the invention.

DETAILED DESCRIPTION OF THE PREFERRED EMBODIMENTS

The present invention is directed to an improved method, apparatus and system, for notifying a user of a communication device, such as a smartwatch or smartphone, of a new communication that renders prior communications less relevant. The following description stresses the use of the invention with smartwatches and smartphones, but is useful with any network-connected device (e.g., a smartphone, tablet, laptop, etc.) and/or external communication devices (e.g., smartwatch, smartnecklace, etc.).

Figure 1A:
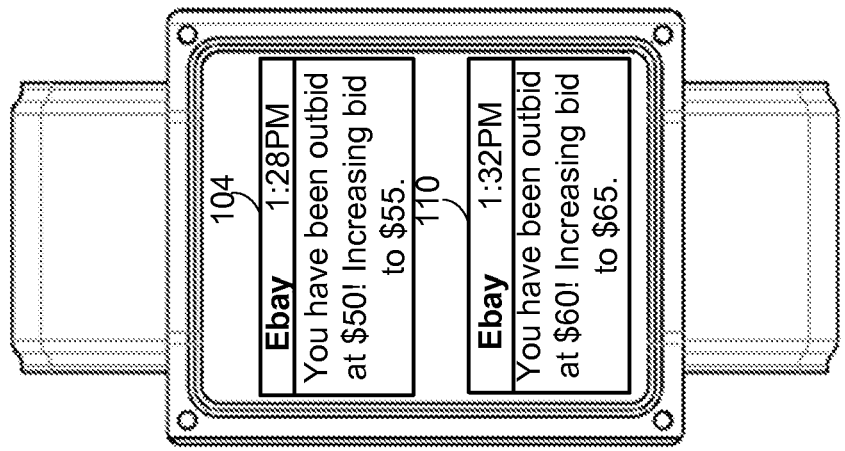
FIGS. 1(a)-(c) are exemplary prior art systems.
Figure 1B:
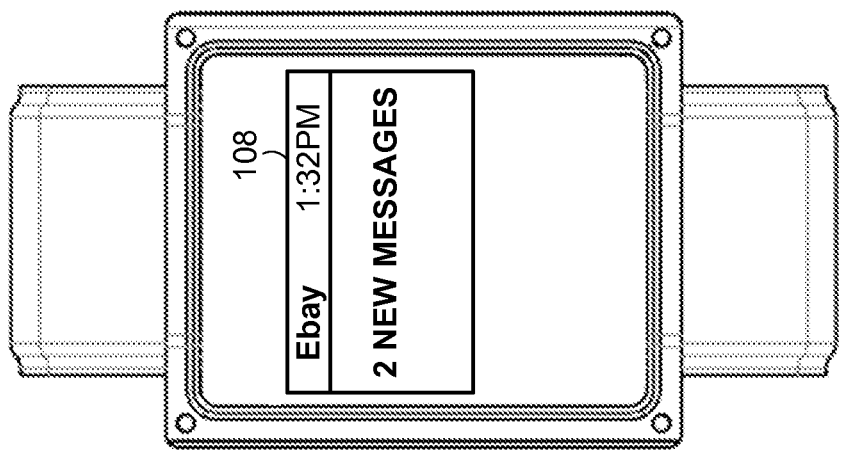
Figure 1C:
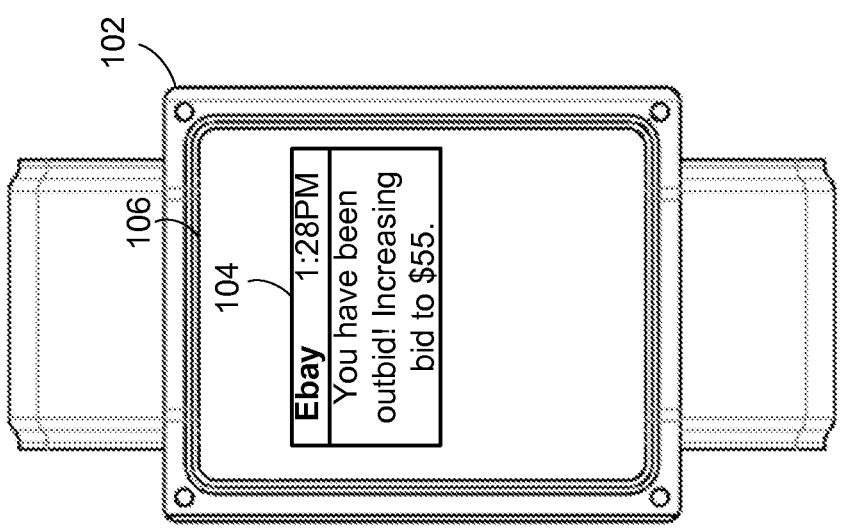
Figure 2:
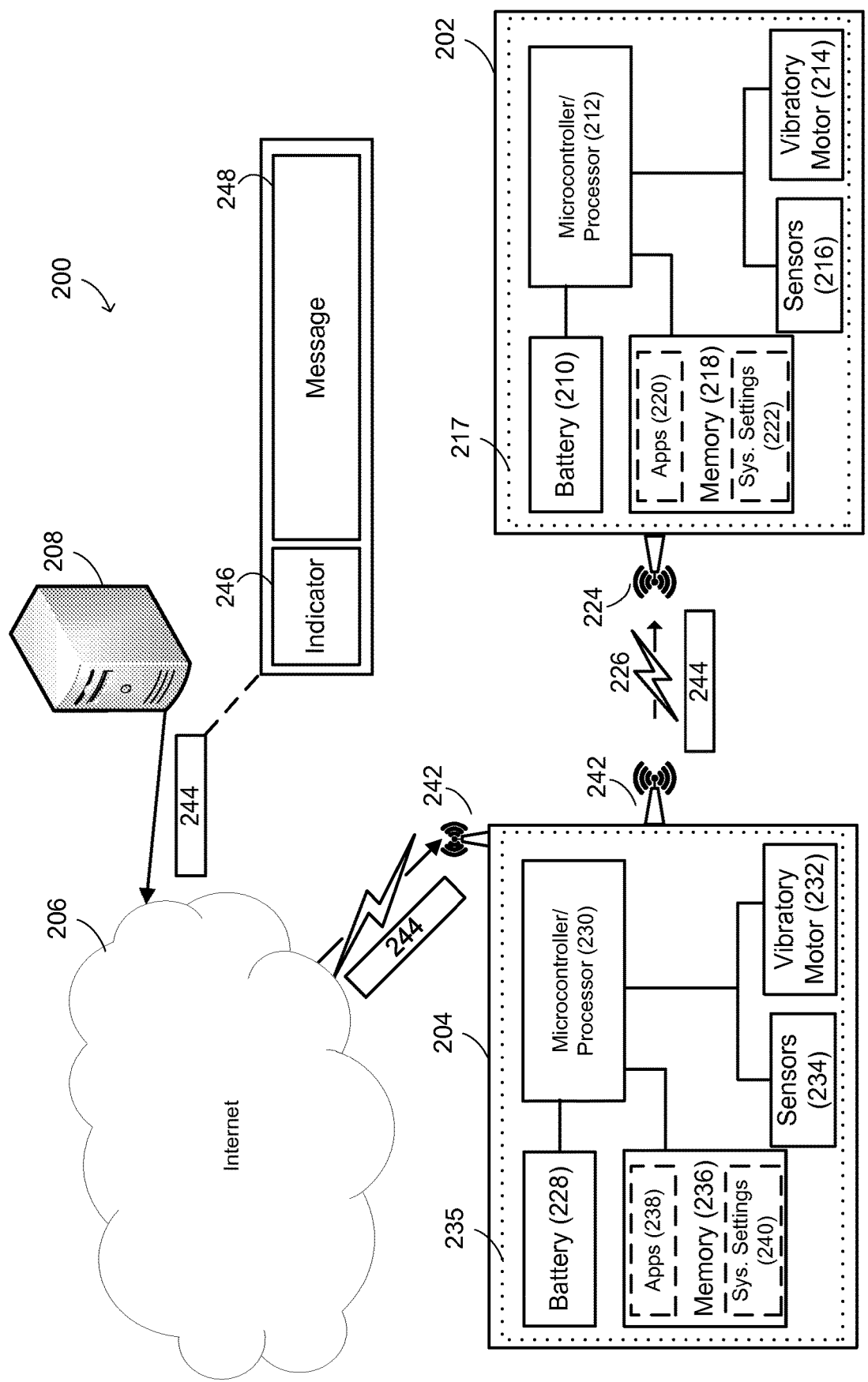
FIG. 2 illustrates an exemplary system for use with the present invention, which includes an external device, network-connected device, and remote server.
Figure 4:
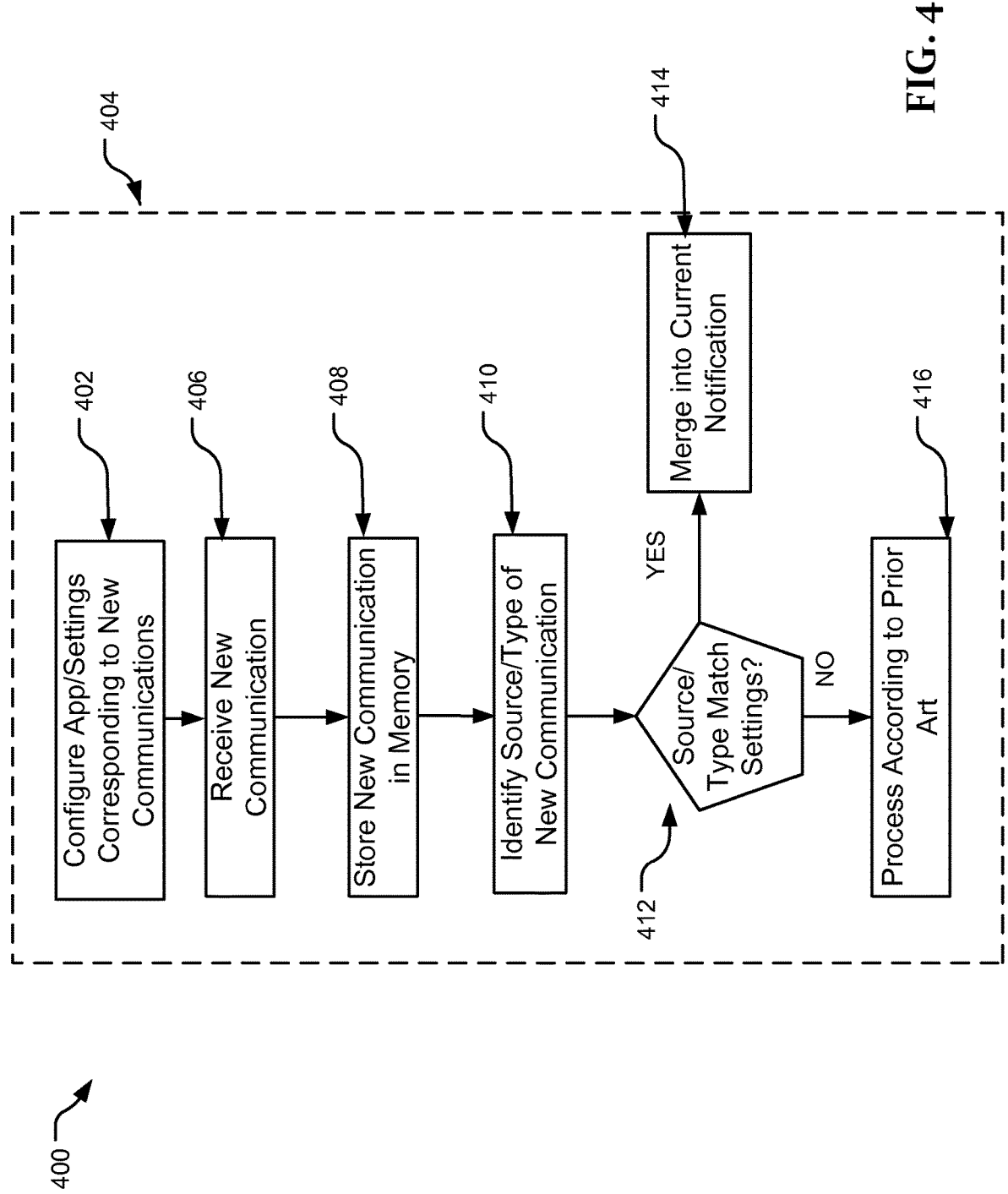
FIG. 4 is a flow chart for another embodiment of a method of the disclosed system.
Figure 5:
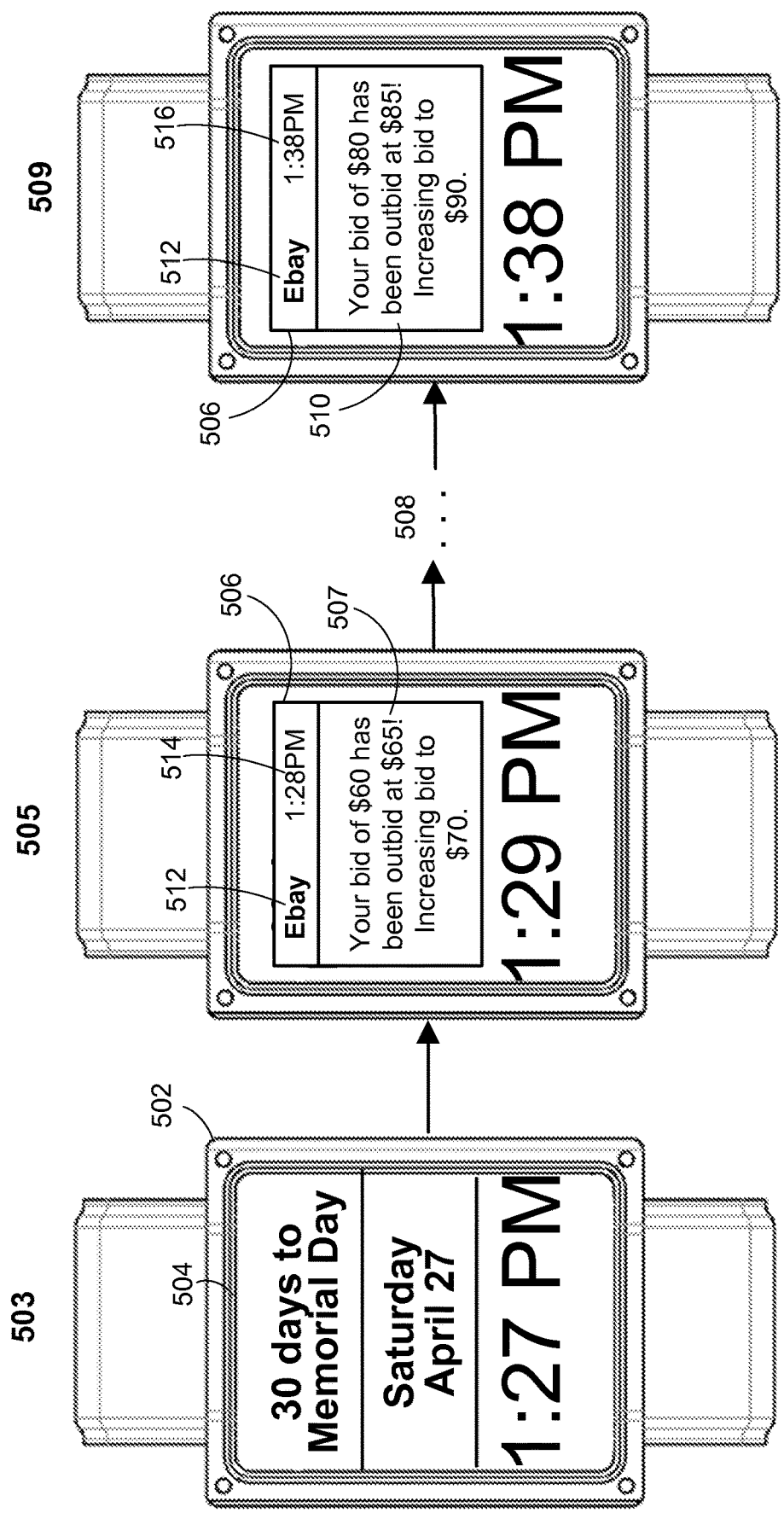
FIG. 5 illustrates the manner in which notifications are modified on a display in accordance with embodiments of the present invention.
Figure 6:
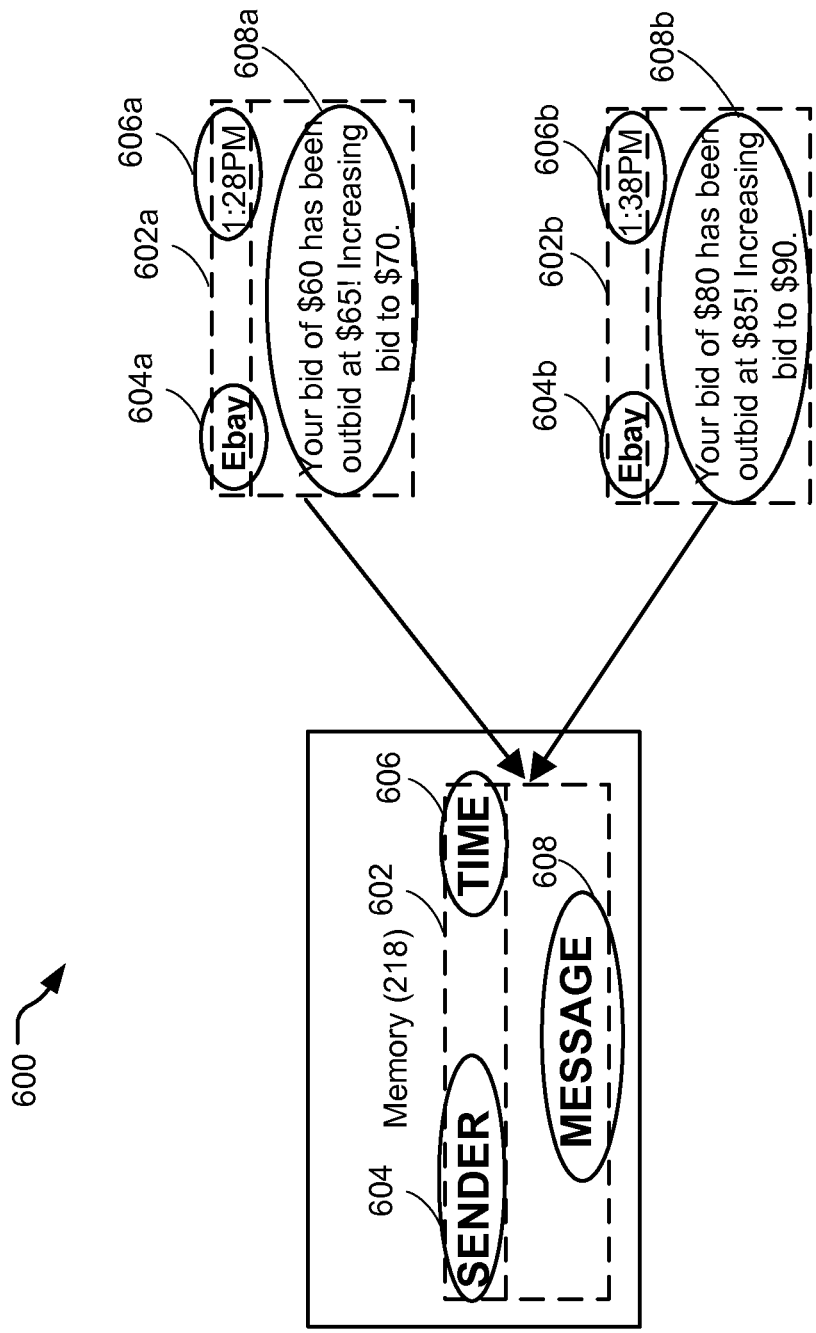
FIG. 6 illustrates the manner in which new messages are merged into a pending notification in accordance with embodiments of the present invention.

With this in mind, the following description begins in reference to FIG. 2 with an exemplary system for use with the present invention, which implements components such as an external device, network-connected device, and remote server. The description continues with the flow chart illustrated in FIG. 3, which illustrates an embodiment of a method of the present invention. Next follows a flow chart in FIG. 4, which illustrates a different embodiment of the present invention. FIG. 5 illustrates how merging a new message into a pending notification may appear on the display of a communication device. FIG. 6 illustrates how the merging of the new message into a pending notification takes place. It would be understood by those of ordinary skill in the art that these are non-exhaustive examples of implementations of the present invention, and that numerous other embodiments are apparent based on the teachings herein.

Turning now to FIG. 2, a system 200 that may be used with an embodiment of the present invention is shown. The system may comprise an external communication device 202, network-connected device 204, network 206, and remote server 208. The external communication device 202 may be, for example, an electronic accessory device that communicates with the network-connected device 204. While in the present embodiment the external communication device 202 is a smartwatch, non-exclusive examples of an external communication device include smartwatches (e.g., Pebble SmartWatch™), smart necklaces, smart earrings, and smart rings. The external communication device 202 may be comprised of a battery 210, microcontroller or processor 212, vibratory motor 214, sensors 216 (e.g., GPS, accelerometer), display 217 (e.g., LCD) and memory 218. The memory 218 may include storage for applications 220 to be executed by the microcontroller or processor 212. The memory 218 may also store system settings 222 corresponding to a particular application or the operating system of the external communication device 202. It will be appreciated that the memory discussed herein may include volatile and non-volatile, removable and non-removable media implemented in any method or technology for storage of information, such as computer readable instructions, data structures, program modules, or other data. Examples of computer storage media include RAM, ROM, EEPROM, flash memory or any other medium which can be used to store the desired information and which can be accessed by a processor. The communication device 202 may be connected to the network-connected device 204 via wireless interface 210 using a wireless communication protocol 212, including but not limited to BlueTooth®, ultra-wideband, ZigBee®, or Wi-Fi®. However, any connection may be suitable for connecting the external communication device 202 to the network-connected device 204, including known wired and long-range wireless protocols.

The network-connected device 204 may comprise a battery 228, microcontroller/processor 230, vibratory motor 232, sensors 234, display 235 and memory 236. Non-exclusive examples of a network connected device 204 are a smartphone (e.g., Apple® iPhone®), laptop computer, and tablet device (e.g., Apple® iPad®). As with the external communication device 202, the memory 236 may store applications 238 for execution by the microcontroller/processors 230 and may also store system settings 240 corresponding to a particular application or the system of the network-connected device 204. The network-connected device 204 may be connected to the external communication device 202 via a wireless interface 242 using the wireless protocol 226. The network-connected device 204 may also be connected to a remote server 208 using a network, such as Internet 206, via a network interface 242.

The remote server 208 may provide applications to network-connected device 204 and/or external communication device 202 via the Internet 206. The remote server 208 may also provide new communications to network-connected device 204 and/or external communication device 202. Non-exclusive examples of such communications include text messages and/or messages provided by an application server, such as the server corresponding to the eBay® bidding application previously discussed.

In an embodiment of the present invention, a new communication 244 is generated by remote server 208 and is assigned an indicator 246 by the remote server 208. A detailed view of new communication 244 illustrates that the new communication 244 also contains a message 248. The indicator 246 may be any character(s) embedded in the new communication 244, including but not limited to a numeric, alphabetic, or alphanumeric characters. The purpose of the indicator is to inform a downstream device, such as network-connected device 204 and/or external device 202 that the message corresponding to the new communication should be merged into a pending notification containing an old message. As illustrated in FIG. 2, the new communication 244 travels from remote server 208 to network-connected device 204. When the new communication 244 reaches network-connected device 204, the communication 244 is stored in memory 236 and the processor may read the communication 244 to determine if an indicator 246 is present. Alternatively, the new communication 244 can be sent to the external communication device 202 by network-connected device 204 and the external communication device 202 may determine whether the new communication 244 contains the indicator 246.

If the indicator 246 is detected by the network-connected device 204, the network-connected device 204 may send the new communication 244 to the external device 202 with instructions to modify a pending notification with the message 248 of the new communication 244 by merging the message 248 into the notification. Alternatively, if the new communication 244 is sent to the external communication device 202 by the network-connected device 204 without the network-connected device 204 determining if the indicator 246 is present, the external communication device 202 may perform the step of determining if the indicator 246 is present. In that case, once the new communication 244 is received by the external communication device 202, it is stored in memory 218 and read by microcontroller/processor 212 to determine if the indicator 246 is present. If the indicator 246 is present, the external device 202 merges the new message 248 into the pending notification.

In yet another embodiment, the new communication 244 may be assigned an indicator 246 by the network-connected device 204, rather than by the remote server 208. Whether an indicator should be assigned by the network-connected device 204 may be determined automatically by the programming of an application or by application or system settings stored in memory 236 of the network-connected device 204. For example, the eBay® application may be programmed by the developer to automatically assign an indicator to any communication generated by the application that is to be transmitted to the network-connected device 204 or external communication device 202. Alternatively, the user may manually configure the application or system settings 240 of the network-connected device 204 to assign an indicator to any communication originating from a particular source. For example, the user may alter the system settings 240 of the network-connected device 204 to automatically assign an indicator to eBay® communications/notifications that are to be forwarded/sent to the external communication device 202. In yet another example, the eBay® application may have user definable settings which allow the user to determine if communications from the application should be assigned an indicator before being forwarded/sent to the external communication device 202. The eBay® application may further allow the user to define which specific types of eBay® communications should be assigned indicators. For instance, a user may configure the application to only assign an indicator to communications relating to the bid status of a particular item, while notifications relating to general eBay account user information of the user would not be assigned an indicator. It will be appreciated that such control by a user allows the user to specify which types of communications/notification should be modified in accordance with the present invention. This may be important as certain older communications may not be irrelevant to a user in light of a newer communication. For example, a new message from the eBay® application relating to a user's general account will likely always be relevant to the user, regardless of whether it is the most recent message. In stark contrast, older messages intended solely to inform a user that the status of a bid has changed will likely be irrelevant in light of a newer message relating to the same bid.

After assigning the indicator 246, the network-connected device 204 then sends the new communication 244 to the external communication device 202. The external communication device 202 then stores the new communication 244 into memory and the microcontroller/processor 212 reads the new communication 244 to determine whether an indicator is present. When the indicator 246 is detected, the external device 202 merges the new message 248 into a pending notification.

Figure 3:
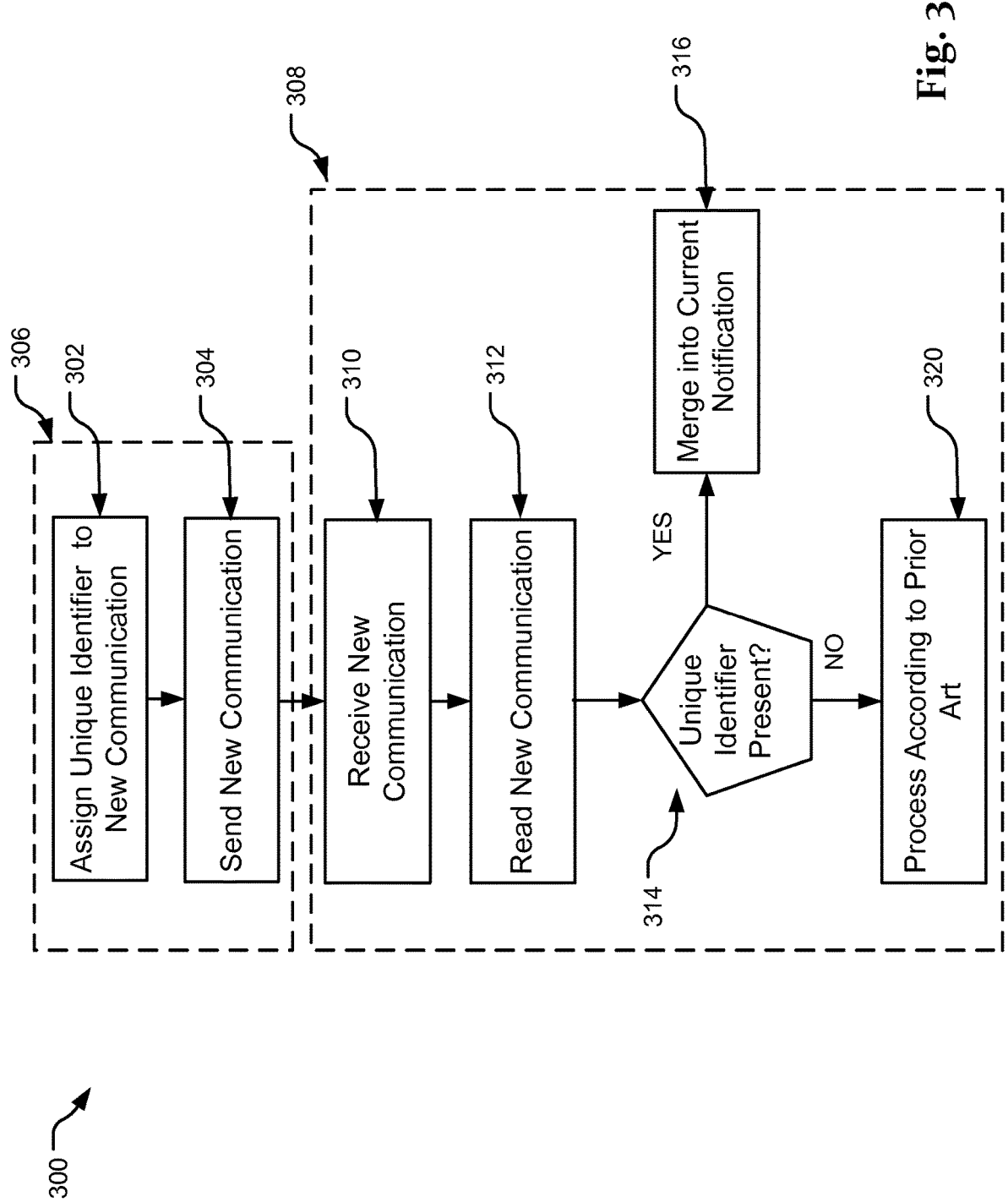
FIG. 3 is a flow chart for an embodiment of a method of the disclosed system.

In reference to FIG. 3, a flow chart 300 illustrates a method of the embodiments discussed above. At initial step 302, a new communication is assigned an indicator by a first device 306 (e.g., remote server 208 or network-connected device 204). Next, at step 304 the new communication (including the indicator) is sent to a second device 308 (e.g., network-connected device 204 or external communication device 202). The new communication is then received by the second device 308 at step 310. At step 312 the new communication is read by the second device 308. The second device 308 then determines whether an indicator is present in the new communication at step 314. If an indicator is detected, then at step 316 the new message of the new communication merges into a pending notification by replacing an older message corresponding to an older communication. If no indicator is detected, then at step 320 the notification is processed according to known prior art notification systems.

In yet another embodiment, the network-connected device 204 or external communication device 202 may be configured to only evaluate new communications 244 for an indicator 246 that originate from a particular source or sources. For example, external communication device 244 may be configured to only review new communications 244 originating from eBay® to look for an indicator 246. In this way the receiving device of the notification (e.g., external communication device 202) may be able to filter which communications it evaluates for an indicator by source. Those of skill in the art would recognize that there are many other criteria that could be used to determine whether a new communication should be reviewed for an indicator, including but not limited to the type of communication or time in which the communication was received.

In yet another embodiment, whether a new communication 244 should be treated as if it contains an indicator may be determined by the network-connected device 204 or the external communication device 202, even if an indicator was not assigned upstream of the receiving device. The receiving device may determine if the new communication 244 is treated as if it has an indicator based on the original sender of the communication and an identifier within the communication. For example, the network-connected device 204 or external communication device 202 may be configured to evaluate new eBay® communications 244 to determine whether the communication contains a specific type of identifier (e.g., the eBay® auction ID, which is the identifier eBay uses for auctions). If the specific type of identifier is present in the new communication 244, the identifier may be treated as an indicator, which allows the message in the new communication to be merged into a current notification having the same indicator. In this way, a notification is not required to have an indicator assigned upstream of the receiving device, as the receiving device effectively determines which received communications should be treated as if they have indicators and what those indicators should be. In other words, the receiving device determines, completely on its own, which new messages are treated as if they have an indicator. As those having ordinary skill in the art will appreciate, any criteria could be used for determining whether a communication should be treated as containing an indicator and what specific information should be used as an indicator.

In yet another embodiment, the new communication may be received by the external communication device without an assigned indicator. However, an application or system setting stored in the memory of the external communication device 202 may be programmed to treat incoming communications from a particular source the same as a new communication containing an indicator. For example, the eBay® application on the external device 202 may be programmed to treat all incoming communications from eBay the same as those having an indicator, even though no indicator was assigned to the communication by an upstream device. As such, when a new communication is received by the external device from eBay, the message of the new communication is merged into a pending notification. Alternatively, a user may alter the system settings of the external device to treat new incoming notifications from a particular source in the same manner. For example, a user may alter the system settings to treat all new incoming text communications from a particular phone number the same as those having an indicator. As one example, a user may alter the settings to treat all weather notification text messages emanating from a local weather station SMS server the same as those that have an indicator. As such, a pending notification, which would include an older message from the local weather station, would be modified by a new message from the local weather station by merging the new message into the notification. A flow chart 404 depicting the steps of this embodiment is illustrated in FIG. 4. At step 406 an application or system settings of the external device 404 are configured to treat new communications from a specific source the same as those having an indicator. For example, a user may configure the application or system settings at step 402 to treat all incoming communications from eBay the same as it would any other communication having an indicator. The user may additionally configure the application or system settings to treat particular types of communications the same as it would any other communication having an indicator. In this way, a user may configure certain communications emanating from eBay to be treated the same as those having an indicator, while others will be treated normally (i.e., older communications are not treated as irrelevant). This may be important to a user because, as stated before, certain types of communications (e.g., ones relating to general user account information) may always be considered relevant, while other notifications (e.g., bid status notifications) may lose relevance as new messages are received. Configuring the present embodiment in this manner may ensure that other eBay notifications (e.g., general account information notifications) are not unintentionally concealed from the user. At step 402 a new communication is received by the external communication device 404 and the communication is stored in memory at step 408. The source and/or type of the new communication is then identified by the external device 404 at step 410. At step 412, the processor/controller of the external device 404 then determines whether the identified source and/or type falls within the parameters of the app/system settings from step 402. If the source does, then a new message corresponding to the new communication is merged into the notification at step 414. If the source does not fall within the parameters of the app/system settings from step 402, then at step 416 the notification is processed according to known prior art notification systems.

Turning now to FIG. 5, a non-exclusive example of the manner in which a new message may be merged into a pending (as explained at step 316 and 414) is illustrated in accordance with the previous embodiments of the present invention. External communication device 502 (e.g., a smartwatch) may include all of the components inside external communication device 202, including a display 504. The display may generate a watch face and display various status information, such as the time and date. Additionally, the watch face may convey other information, such as upcoming calendar events.

As previously discussed, an external communication device 502 may be configured to receive communications from a network-connected device or a remote server. In this example, the new communication received relates to an eBay® bid, alerting the user that his or her previous bid how been outbid and that the user's bid has automatically been increased. The user has configured his or her eBay® account to automatically place a $5 bid after each new bid, up until a certain pre-determined threshold. Step 503 illustrates the display of the external communication device 502 when no notification is displayed. At step 505 a new communication is received, and the external communication device 502 generates a notification 506 corresponding to the new communication. The notification indicates the sender 512 of the new communication (i.e., eBay®), the time the new communication was received 514 (i.e., 1:28 PM), and the message of the new communication 507 (i.e., "Your bid of $60 has been outbid at $65! Increasing bid to $70."). At step 509 a new message 510 is received and merged into the notification 506 by replacing the most recent prior message with the newest message 510, which indicates the user has been outbid at $80 and that a new bid of $85 has been automatically placed on behalf of the user. The time 516 (i.e., 1:38 PM) may also change to reflect the time that the merge took place. During period 508, numerous other new messages (at similar $5 increments) were received, and for each new message received the same merging process occurred. Importantly, message 510 is the only message displayed at 1:38 PM, as the notification 506 was modified as each prior message was replaced by the newest message the process at the time. As such, message 507 is replaced by the first message received during period 508, and that message is replaced by the second message received in period 508, so forth and so on until the final message 510 is received and replaces the most recent message from period 508. Those of skill in the art will appreciate that merging new messages into a notification as described herein more efficiently conveys relevant information to the user of the external device, while concealing information that may be considered irrelevant. The previous message may be completely overwritten during the merging process (i.e., the user may not be able to access it anymore), which allows for additional conservation of memory and also removes additional information from the display that the user would likely find irrelevant.

Turning to FIG. 6, a detailed description of the process 600 of merging a new communication into a pending notification is illustrated in accordance with an embodiment of the present invention. Generally, when a new message is received that is to be treated as if it has an indicator (as discussed with regard to FIGS. 2-4), a notification is generated that is exclusively assigned to a specific portion 602 of the memory 218 of the device on which the notification is to be displayed. The notification is configured to display the new message, as well as the sender of the message and the time the message was received. The assigned portion 602 of memory contains an exclusive assignment in memory for the fields of (1) the sender of the message 604, (2) the time the message is received 606, and the substance of the message 608. Going forward, any new communication corresponding to the same indicator will only modify the exclusive portion of memory assigned to the pending notification (i.e., a notification that is still being displayed). For example, when a new message having the same indicator is received while the notification is still pending, the new message is merged into the notification by modifying the portion of the memory exclusively allotted to the notification message 608. Additionally, the portion of the memory corresponding to the time the message was received 606 may also be modified. In this way, the message and time of the pending notification are overwritten completely. This essentially brings the new message forward in time, overwriting in memory all previous messages having the same indicator. In real time and from the perspective of the device user, the only portion of the displayed notification that will appear to change when a new message is received will be the message of the notification itself and the time the notification is received. For example, in reference to FIG. 6, receipt of a new communication containing a new message causes notification 602a to be generated, which includes the sender of the new message 6o4a, the time the new message was received 606a, and the message 608a. 602a is stored in memory 218 at exclusive portion 602. 604a, 606a and 608a are stored in memory 218 at exclusive portions 604, 606, and 608, respectively. While the notification is still pending, a new communication having the same indicator as the last message is received. The new message 608b is merged into the notification by replacing the prior message 608a in the portion of memory exclusively assigned to the message of the notification 608. Similarly, the time the new message was received 606b is merged into the notification by replacing the prior time 606a in the portion of memory exclusively assigned to the time that a message is received 606. Thus, 602b, 604b, 606b, and 608b, correspond to 602, 604, 606, and 608 respectively. Notably, 604 does not change because 604a and 604b are the same and no overwriting needs to occur.

As would be understood by those having ordinary skill in the art, the disclosed embodiments are intended to be illustrative and non-exhaustive. There are numerous other use cases for the present invention which would be understood by those having ordinary skill in the art but that are not specifically described or discussed herein. Examples of additional use cases are described below, but are not intended to be exhaustive.

In one use case, a sports scores notification application or SMS notification system may be used in accordance with an embodiment of the present invention. The user of such an application may have little to no interest in receiving older notifications or updates that do not reflect the current score or statistics of the game being tracked. As such, a user may prefer to have older messages in a notification replaced or annotated by newer messages so that the older messages do not occupy scarce notification display space on a network-connected device or external communication device. In that case, the notification system of the present invention would be advantageous.

In another use case, a user may opt in to receive weather alerts via the SMS messaging system or via a weather alert application. The user may have little or no interest in receiving older notifications or alerts that relate to weather that has already passed. For example, one alert may notify the user that there is a tornado warning between 2:00 PM and 5:00 PM. If the user receives a new notification at 5:30 PM informing the user that the tornado warning has ended, the user will likely have no interest in the previous notification. As such, the notification system of the present invention would be advantageous, as it would allow the user to only see the notifications of interest.

In yet another use case, a user may opt in to receive shipping notifications via an SMS shipping notification system or shipping application. The user may receive a notification informing the user that his or her package has left the distributor's out-of-state shipping facility and then a later new notification informing the user that the package is out for delivery to the user's home. The user will likely have little or no interest in the previous notification, as the previous location of the package is unimportant to the user. In that case, the notification system of the present system would be advantageous.

It will be understood by those having ordinary skill in the art that the above descriptions are intended to be illustrative, and not restrictive. For example, the above-described embodiments may be used in combination with each other and features of one embodiment may be utilized with other embodiments. Many other embodiments will be apparent to those of ordinary skill in the art upon reviewing the above description. For example, invention described herein may be implemented in other wearable technologies other than watches, such as wearable necklaces, ear rings, etc. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. One or more non-transitory computer-readable storage media storing computer-executable instructions that, when executed on a computer system perform operations, the operations comprising:
    assigning a portion of memory to a notification having at least one field, wherein the portion includes exclusive assignments in the memory for the at least one field, the at least one field comprising a first field that corresponds to a message of a communication;
    receiving a new communication from another device, wherein the new communication contains a new message;
    determining whether to evaluate the new communication for an indicator based on whether the new communication originates from a predetermined source or the new communication is of a predetermined type;
    when the new communication does not originate from the predetermined source or the new communication is not of the predetermined type, processing the new communication without merging the new communication into the notification or overwriting the first field with the new message; and
    when the new communication originates from the predetermined source or the new communication is of the predetermined type, determining to evaluate whether the new communication contains the indicator, and, if the new communication contains the indicator, merging the new communication into the notification by overwriting the first field with the new message.

2. The one or more non-transitory computer-readable storage media of claim 1, wherein
    when the new communication is of a first predetermined type associated with communications relating to a general user account information notification, the operations include processing the new communication without merging the new communication into the notification or overwriting the first field with the new message, and
    when the new communication is of a second predetermined type associated with communications relating to a bid status notification, the operations include determining to evaluate whether the new communication contains the indicator.

3. The one or more non-transitory computer-readable storage media of claim 2, wherein
when the new communication originates from a first entity corresponding to a first predetermined source, the operations include processing the new communication without merging the new communication into the notification or overwriting the first field with the new message, and
when the new communication originates from a second entity corresponding to a second predetermined source, the operations include determining to evaluate whether the new communication contains the indicator.

4. The one or more non-transitory computer-readable storage media of claim 3, wherein the operations further comprise:
identifying a source of the new communication based on at least one of a phone number associated with the new communication, a server associated with the new communication, or a company associated with the new communication.

5. The one or more non-transitory computer-readable storage media of claim 1, wherein the operations further comprise:
providing, for presentation on a display space of an electronic device, the notification having the at least one field, and
merging the new communication into the notification comprises overwriting the first field with the new message such that a same portion of the display space which is used to display the message of the communication is subsequently used to display the new message of the new communication which replaces the message of the communication.

6. A wearable computing device, comprising:
a display portion having a display space;
a memory configured to store instructions; and
a processor configured to execute the instructions stored in the memory to perform operations, the operations including:
assigning a portion of the memory to a notification having a plurality of fields, wherein the portion of the memory includes exclusive assignments in the memory for at least one field among the plurality of fields, the at least one field comprising a first field that corresponds to a message of a communication,
receiving a new communication from another device, wherein the new communication contains a new message;
determining whether to evaluate the new communication for an indicator based on whether the new communication originates from a predetermined source or the new communication is of a predetermined type,
when the new communication does not originate from the predetermined source or the new communication is not of the predetermined type, processing the new communication without merging the new communication into the notification or overwriting the first field with the new message, and
when the new communication originates from the predetermined source or the new communication is of the predetermined type, determining to evaluate whether the new communication contains the indicator, and, if the new communication contains the indicator, merging the new communication into the notification by overwriting the first field with the new message such that a same portion of the display space which is used to display the message of the communication is subsequently used to display the new message of the new communication which replaces the message of the communication.

7. The wearable computing device of claim 6, wherein merging the new communication into the notification includes not overwriting at least one other field among the plurality of fields in which information of the communication included in the at least one other field does not change with respect to information of the new communication which is to be included in the at least one other field.

8. The wearable computing device of claim 6, wherein the wearable computing device is a smartwatch.

9. The wearable computing device of claim 6, wherein
when the new communication is of a first predetermined type associated with communications relating to a general user account information notification, the operations include processing the new communication without merging the new communication into the notification or overwriting the first field with the new message, and
when the new communication is of a second predetermined type associated with communications relating to a bid status notification, the operations include determining to evaluate whether the new communication contains the indicator.

10. The wearable computing device of claim 9, wherein
when the new communication originates from a first entity corresponding to a first predetermined source, the operations include processing the new communication without merging the new communication into the notification or overwriting the first field with the new message, and
when the new communication originates from a second entity corresponding to a second predetermined source, the operations include determining to evaluate whether the new communication contains the indicator.

11. The wearable computing device of claim 10, wherein the operations further comprise:
identifying a source of the new communication based on at least one of a phone number associated with the new communication, a server associated with the new communication, or a company associated with the new communication.

* * * * *